Figure 1:
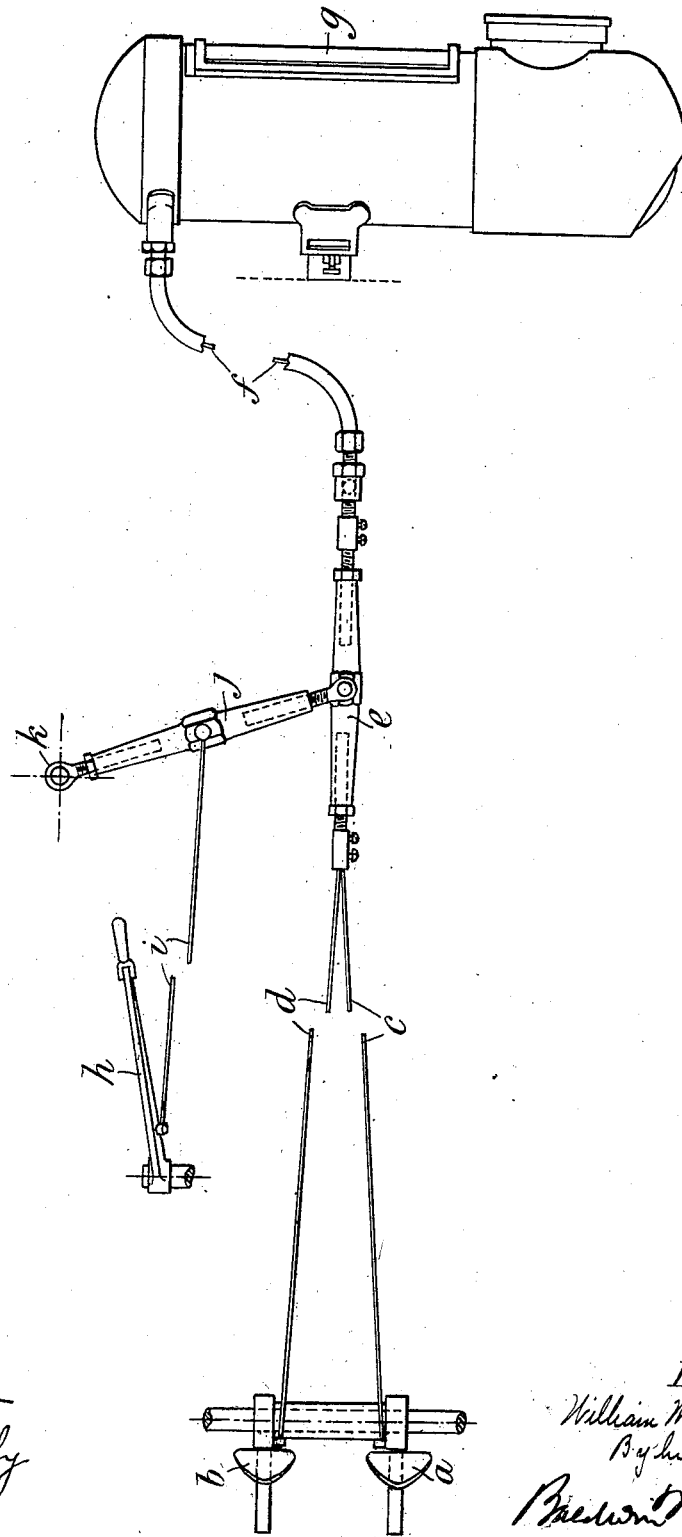

W. M. ROLPH.
SIGNALING APPARATUS FOR USE WITH MOTOR DRIVEN VEHICLES.
APPLICATION FILED MAY 12, 1913.

1,121,870.

Patented Dec. 22, 1914.

3 SHEETS—SHEET 1.

Witnesses
M. E. Burrell
C. F. Early

Inventor
William Mair Rolph
By his Attorneys

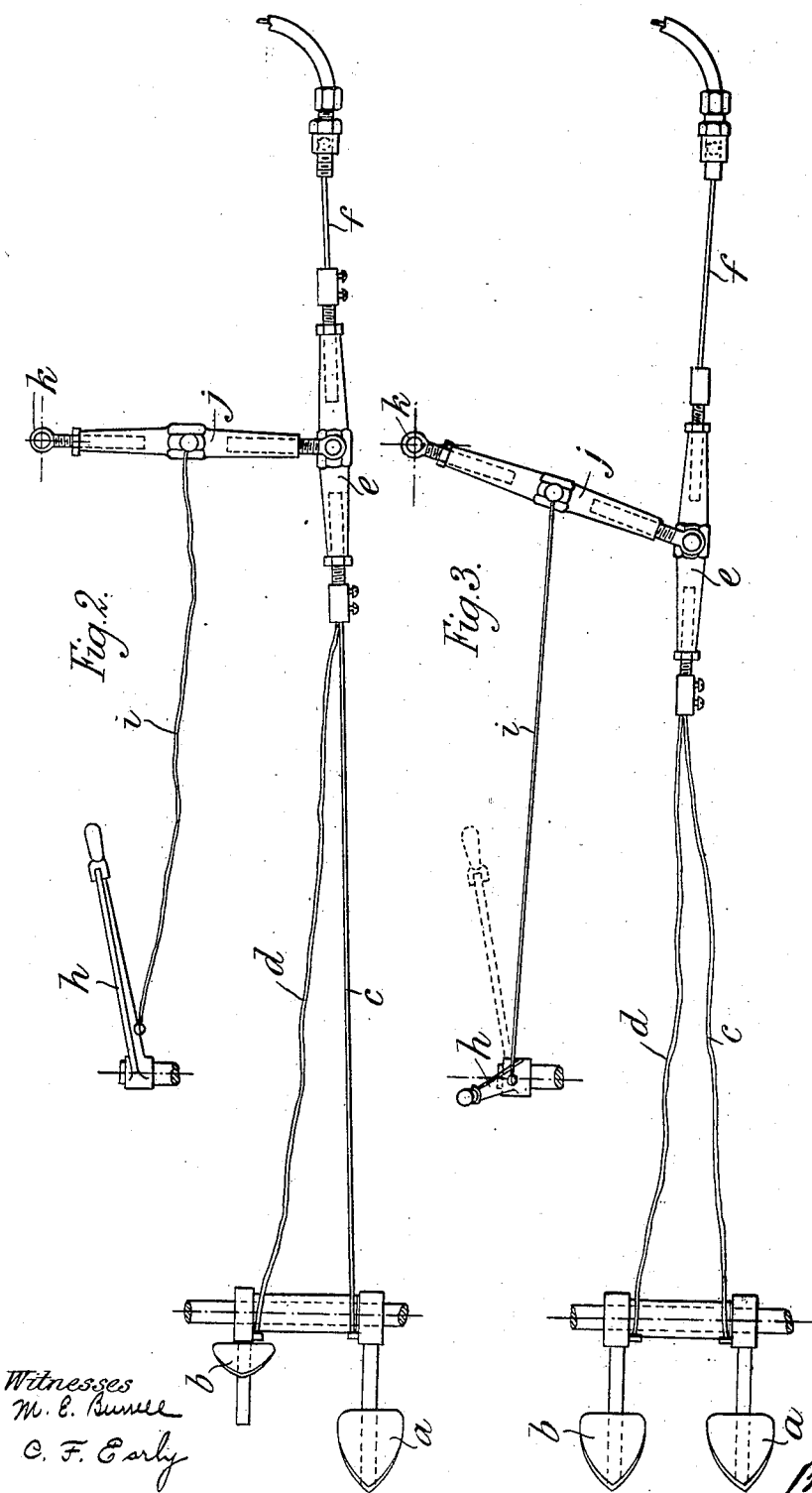

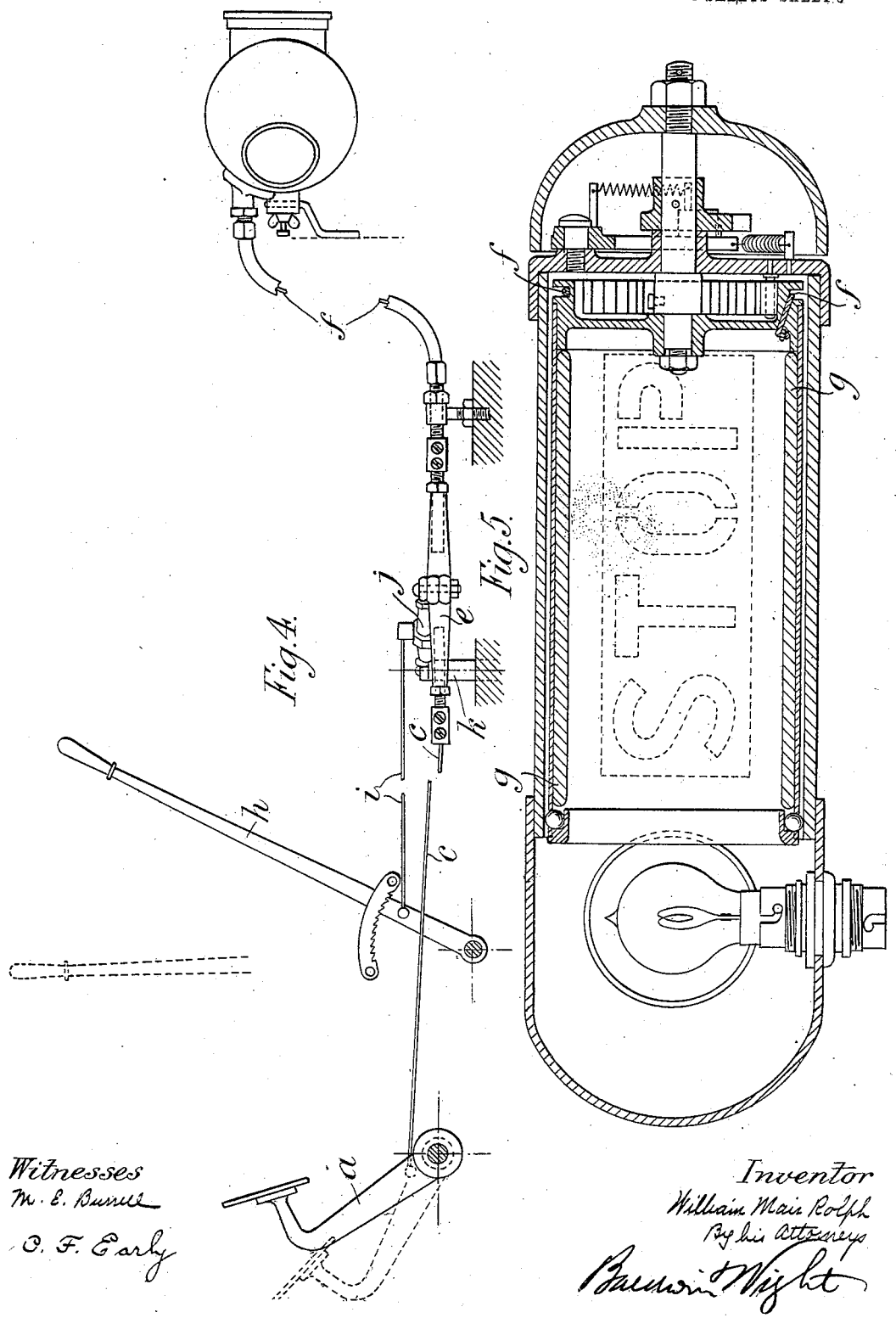

UNITED STATES PATENT OFFICE.

WILLIAM MAIR ROLPH, OF LONDON, ENGLAND.

SIGNALING APPARATUS FOR USE WITH MOTOR-DRIVEN VEHICLES.

1,121,870. Specification of Letters Patent. Patented Dec. 22, 1914.

Application filed May 12, 1913. Serial No. 767,210.

*To all whom it may concern:*

Be it known that I, WILLIAM MAIR ROLPH, a subject of the King of Great Britain, residing at Norwich Union Building, 39 St. James's street, London, England, have invented new and useful Improvements in and Relating to Signaling Apparatus for Use with Motor-Driven Vehicles, of which the following is a specification.

This invention relates to improvements in and relating to signaling apparatus for use with motor driven vehicles.

According to this invention the signaling apparatus, which may be a combined indicator and tail lamp, is automatically operated by the clutch or brake pedal or side brake lever. To effect this the pedals and levers above mentioned are connected by wires or rods to a pivoted arm which may be carried by a bracket or in a case fitted beneath the vehicle. The arm is connected to the indicator by means of a Bowden or other wire. The connections of the pedals and the side brake lever with the pivoted arm are at different distances from the pivot, so that the arm is turned a greater or less degree according to the pedal or lever operated, thus giving the proper amount of turning movement required to show either "Slow" or "Stop" on the apparatus. Means are provided for adjusting the length of the connecting wires.

The drawings show apparatus made in accordance with this invention.

Figures 1, 2, and 3 are plans showing the apparatus in three different positions. Fig. 4 is a side elevation of Fig. 1 and Fig. 5 is a longitudinal section of the indicator.

*a* is the clutch pedal and *b* the brake pedal connected by wires *c* and *d* to the rod *e* to which is also connected a Bowden wire *f* attached to the revolving cylinder *g* of the indicator as is shown in Fig. 5. The hand brake lever *h* is connected by a wire *i* to the arm *j* pivoted at *k*, to the other end of which is also pivotally connected the rod *e*.

In Fig. 1 the parts are shown with the clutch in gear and neither of the brakes in action no signal being made by the indicator.

In Fig. 2 the clutch pedal *a* is depressed the clutch being put out of gear. The Bowden wire *f* is pulled a short distance as shown, the indicator showing the word "Slow"; the same result being also attained by depressing the brake pedal *b*. In Fig. 3 the hand brake lever *h* has been operated and the Bowden wire *f* has been pulled a greater distance, the indicator showing the word "Stop." By these means neither the brake mechanism nor the clutch can be operated without an appropriate signal being given at the back of the car.

What I claim is:—

In a device of the character described, a hand brake-operating mechanism, a clutch-operating mechanism and a brake-operating mechanism in combination with a pivoted arm, an indicator, a connection between the indicator and the pivoted arm, a connection between the pivoted arm and the clutch-operating mechanism, a connection between the pivoted arm and the brake operating mechanism for moving said pivoted arm a certain extent to give a certain signal and a connection between the pivoted arm and the hand brake-operating mechanism for moving the pivoted arm to a greater extent to give a different signal.

WILLIAM MAIR ROLPH.

Witnesses:
O. J. WORTH,
W. E. ROGERS.